(12) United States Patent
Unno et al.

(10) Patent No.: US 10,724,688 B2
(45) Date of Patent: Jul. 28, 2020

(54) EMERGENCY RELEASE SYSTEM FOR LIQUEFIED HYDROGEN

(71) Applicants: KAWASAKI JUKOGYO KABUSHIKI KAISHA, Kobe-shi, Hyogo (JP); TOKYO BOEKI ENGINEERING LTD., Tokyo (JP)

(72) Inventors: Shuntaro Unno, Kobe (JP); Tomonori Takase, Kakogawa (JP); Tomoaki Umemura, Kobe (JP); Tsutomu Kawai, Yokohama (JP)

(73) Assignees: KAWASAKI JUKOGYO KABUSHIKI KAISHA, Kobe (JP); TOKYO BOEKI ENGINEERING LTD., Tokyo (JP)

( * ) Notice: Subject to any disclaimer, the term of this patent is extended or adjusted under 35 U.S.C. 154(b) by 39 days.

(21) Appl. No.: 15/743,306

(22) PCT Filed: Jul. 11, 2016

(86) PCT No.: PCT/JP2016/003284
§ 371 (c)(1),
(2) Date: Jan. 10, 2018

(87) PCT Pub. No.: WO2017/010082
PCT Pub. Date: Jan. 19, 2017

(65) Prior Publication Data
US 2018/0195671 A1    Jul. 12, 2018

(30) Foreign Application Priority Data

Jul. 14, 2015    (JP) .................................. 2015-140269

(51) Int. Cl.
*B67D 7/32* (2010.01)
*F17C 13/12* (2006.01)
(Continued)

(52) U.S. Cl.
CPC ............ *F17C 13/126* (2013.01); *B63B 27/24* (2013.01); *B67D 7/3218* (2013.01); *B67D 9/02* (2013.01);
(Continued)

(58) Field of Classification Search
CPC ...... B67D 7/32; B67D 7/3209; B67D 7/3218; B67D 9/02; F17C 13/12; F16L 29/02; F16L 35/00
(Continued)

(56) References Cited

U.S. PATENT DOCUMENTS

| 3,812,998 A | 5/1974 | Amrogowicz | |
| 5,181,750 A * | 1/1993 | Reum | F16L 33/30 285/115 |
| 5,915,410 A * | 6/1999 | Zajac | F16K 1/54 137/341 |

FOREIGN PATENT DOCUMENTS

| JP | S58-79600 U | 5/1983 |
| JP | H06-94177 A | 4/1994 |
| JP | 2000-238898 A | 9/2000 |

OTHER PUBLICATIONS

Original and Translation of DE 2717135 A1; Wiese, Knut; Oct. 26, 1978 (Year: 1978).*

(Continued)

*Primary Examiner* — Marina A Tietjen
*Assistant Examiner* — Paul J Gray
(74) *Attorney, Agent, or Firm* — Oliff PLC

(57) ABSTRACT

An emergency release system includes a first shut-off valve unit which is land-based; and a second shut-off valve unit which is provided for a marine vessel and separably connected to the first shut-off valve unit, and the first shut-off valve unit is provided with a reservoir container which receives liquid air generated in the first shut-off valve unit and dropped, in a state in which the second shut-off valve (Continued)

unit is separated from the first shut-off valve unit, and the system includes a container support mechanism which is capable of retaining the reservoir container at a retracted position in a state in which the first and second shut-off valve units are connected to each other, the container support mechanism being configured to automatically shift the reservoir container to a reserving position, in a state in which the first and second shut-off valve units are separated from each other.

9 Claims, 6 Drawing Sheets

(51) Int. Cl.
*F16L 39/02* (2006.01)
*F16L 35/00* (2006.01)
*B63B 27/24* (2006.01)
*B67D 9/02* (2010.01)
*F17C 13/04* (2006.01)

(52) U.S. Cl.
CPC .............. *F17C 13/04* (2013.01); *F17C 13/12* (2013.01); *F17C 2221/012* (2013.01); *F17C 2223/013* (2013.01); *F17C 2225/013* (2013.01); *F17C 2250/07* (2013.01); *Y02E 60/321* (2013.01)

(58) Field of Classification Search
USPC ....................................... 285/1, 13, 304, 922
See application file for complete search history.

(56) References Cited

OTHER PUBLICATIONS

Feb. 5, 2019 Search Report issued in European Patent Application No. 16824067.9.

\* cited by examiner

EMERGENCY RELEASE SYSTEM FOR LIQUEFIED HYDROGEN

TECHNICAL FIELD

The present invention relates to an emergency release system for liquefied hydrogen equipped in a loading arm for the liquefied hydrogen, and to an emergency release system including a reservoir container which serves to prevent liquid air from being dropped.

BACKGROUND ART

Commonly, a loading arm is used to load and unload fossil fuel such as crude oil, gasoline, light oil, or a natural gas (LNG, LPG) between a transport marine vessel and land-based storage tanks. To prevent damages to the loading arm in a case where an unexpected emergency such as a sudden or rapid movement of a tanker due to, for example, a gust of wind or a tide, occurrence of an earthquake or tsunami, or fire breakout occurs, while the fossil fuel is loaded or unloaded in a state in which the loading arm is connected to a manifold of a LNG pipe of a LNG transport marine vessel, the loading arm is equipped with an emergency release system (ERS).

In the case of the loading arm used to transfer the LNG or the like, when the ERS is activated, a pair of emergency shut-off valves are shut-off and disconnected (separated). The LNG or the like present in the vicinity of a connection opening of the emergency shut-off valve scatters around to an outside area. To prevent spilt (leakage) oil from scattering around from the connection opening of the emergency shut-off valve to an outside area, it is proposed that the ERS is provided with a spilt oil scattering prevention device.

Patent Literature 1 discloses a spilt oil scattering prevention device with a compact configuration, to prevent spilt oil from scattering during activation of the ERS, and prevent the spilt oil from being dropped after a loading arm is disconnected. This spilt oil scattering prevention device includes an outer cover attached on an emergency shut-off valve provided on the tip end side of an arm of the loading arm, an oil tank surrounding a connection opening of the emergency shut-off valve provided on a connected pipe side, an accommodating bag attached to cover the underside of the oil tank, and a hoisting (pull-up) device which hoists (pulls up) the outer cover to an inner side while narrowing the tip end portion of the outer cover.

In a state in which the ERS is not activated, the outer cover is folded and accommodated in the accommodating bag. When the ERS is activated and the pair of emergency shut-off valves are separated from each other, the outer cover prevents the spilt oil from scattering around to an outside area and the oil adhering to the inner surface of the outer cover is led to the oil tank.

CITATION LIST

Patent Literature

Patent Literature 1: Japanese-Laid Open Patent Application Publication No. 2000-238898

SUMMARY OF INVENTION

Technical Problem

In the above-described loading arm for the LNG, it is sufficient that scattering of the LNG whose liquefaction temperature is—161 degrees C., is prevented, because liquid air is not generated in the connection opening of the emergency shut-off valve during activation of the ERS. However, since the temperature of the liquefied hydrogen is—253 degrees C. lower than that of LNG, in the case of the loading arm for the liquefied hydrogen, the liquid air is generated in the connection opening of the emergency shut-off valve due to cold heat of the liquefied hydrogen, when the pair of emergency shut-off valves of the loading arm are separated from each other during activation of the ERS. The generated liquid air falls to sea surface. In some cases, substances (e.g., oil droplets or the like) which react with the liquid air (oxygen) may exist on the sea surface. For this reason, in the case of the loading arm for the liquefied hydrogen, it is necessary to reliably prevent a situation in which the liquid air generated in the connection opening of the emergency shut-off valve falls to the sea surface.

An object of the present invention is to provide an emergency release system (ERS) for liquefied hydrogen including a reservoir container which is capable of preventing a situation in which liquid air generated in a connection opening of an emergency shut-off valve provided on a loading arm side (land-based emergency shut-off valve) is dropped to sea surface, during activation of the ERS of a loading arm for the liquefied hydrogen

Solution to Problem

According to an aspect of the present invention, an emergency release system equipped in a loading arm for liquefied hydrogen, comprises a first shut-off valve unit which is land-based; and a second shut-off valve unit which is provided for a marine vessel and separably connected to the first shut-off valve unit, wherein the first shut-off valve unit is provided with a reservoir container which receives liquid air generated in the first shut-off valve unit and dropped, in a state in which the second shut-off valve unit is separated from the first shut-off valve unit.

In accordance with this configuration, since the emergency release system includes the first and second shut-off valve units, the emergency release system is activated and two shut-off valves of the first and second shut-off valve units are closed, in the case of occurrence of an unexpected emergency. In this way, it becomes possible to prevent a large amount of liquefied hydrogen present inside the loading arm from flowing to an outside area.

Since the first shut-off valve unit is provided with the reservoir container which receives the liquid air generated in the first shut-off valve unit and dropped, in a state in which the first and second shut-off valve units of the emergency release system are separated from each other, it becomes possible to reliably prevent the liquid air generated in the first shut-off valve unit from being dropped to sea surface.

The above emergency release system for liquefied hydrogen may further comprise: a container support mechanism which is capable of retaining the reservoir container at a retracted position that is a lateral position of the first and second shut-off valve units in a state in which the first and second shut-off valve units are connected to each other, the container support mechanism being configured to automatically shift the reservoir container to a reserving position that is immediately below the first shut-off valve unit, in a state in which the first and second shut-off valve units are separated from each other.

In accordance with this configuration, since the emergency release system includes the container support mechanism configured to automatically shift the reservoir container between the retracted position and the reserving position, the reservoir container can be retained at the retracted position that is the lateral position of the first and second shut-off valve units, in a state in which the first and second shut-off valve units are connected to each other.

On the other hand, in a case where an unexpected emergency occurs, the emergency release system is activated, and the first and second shut-off valve units are separated from each other, the reservoir container is moved to the reserving position that is immediately below the first shut-off valve unit and can receive the liquid air generated in the first shut-off valve unit and dropped. Therefore, it becomes possible to reliably prevent the liquid air from being dropped to the sea surface.

In the above emergency release system for liquefied hydrogen, the reservoir container may be retained in a horizontal posture at the reserving position, the reservoir container may be retained in a vertical posture at the retracted position, and the container support mechanism may include: a pair of link members, first end portions of which are secured to both side portions, respectively, of the reservoir container, and second end portions of which are hingedly coupled to both side portions, respectively, of the first shut-off valve unit, the pair of link members extending from the reservoir container to the first shut-off valve unit, and a stay member which is secured to the second shut-off valve unit, and configured to receive and hold the reservoir container at the retracted position from below.

In accordance with this configuration, the container support mechanism includes the pair of link members supporting the reservoir container, and the stay member which is secured to the second shut-off valve unit and configured to receive and hold the reservoir container at the retracted position from below. Therefore, in a case where the emergency release system is not activated, the reservoir container can be received and held by the stay member and can be retained in the vertical posture at the retracted position. On the other hand, in a case where the emergency release system is activated, and the reservoir container is at the reserving position, the stay member ceases to function. Therefore, the reservoir container can be retained in the horizontal posture at the reserving position.

In the above emergency release system for liquefied hydrogen, the reservoir container may be retained in a horizontal posture at the reserving position, the reservoir container may be retained in a vertical posture at the retracted position, and the container support mechanism may include: a L-shaped member, a first end portion of which is secured to a side portion of the reservoir container, a pair of brackets attached on side portions of the first shut-off valve unit, a coupling pin coupling a second end portion of the L-shaped member to tip end portions of the brackets, a spring member which is externally mounted on the coupling pin and configured to bias the reservoir container toward the reserving position, a stay member which is secured to the second shut-off valve unit and configured to receive and hold the reservoir container at the retracted position from below, and a stopper which is secured to the first shut-off valve unit and configured to receive and hold the L-shaped member and retain the reservoir container at the reserving position, in a state in which the first and second shut-off valve units are separated from each other.

In accordance with this configuration, the container support mechanism includes the L-shaped member, the first end portion of which is secured to the side portion of the reservoir container, the pair of brackets attached on the side portions of the first shut-off valve unit, the coupling pin coupling the second end portion of the L-shaped member to the tip end portions of the brackets, the spring member which is externally mounted on the coupling pin and configured to bias the reservoir container toward the reserving position, the stay member which is secured to the second shut-off valve unit and configured to receive and hold the reservoir container at the retracted position from below, and the stopper which is secured to the first shut-off valve unit and configured to receive and hold the L-shaped member and retain the reservoir container at the reserving position, in a state in which the first and second shut-off valve units are separated from each other. Therefore, in a state in which the first and second shut-off valve units are connected to each other, the reservoir container can be received and held by the stay member and retained at the retracted position. On the other hand, in a state in which the first and second shut-off valve units are separated from each other, the spring member biases the reservoir container toward the reserving position, and the stopper receives and holds the L-shaped member. This allows the reservoir container to be retained at the reserving position that is immediately below the first shut-off valve unit.

In the above emergency release system for liquefied hydrogen, the reservoir container may be provided with a plurality of fins protruding from an outer surface of the reservoir container in such a manner that the plurality of fins are integrated with the reservoir container.

In accordance with this configuration, since the reservoir container is provided with the plurality of fins protruding from the outer surface of the reservoir container in such a manner that the plurality of fins are integrated with the reservoir container, ambient heat can be easily absorbed in the reservoir container, and evaporation of the liquid air generated and received by the reservoir container can be facilitated.

In the above emergency release system for liquefied hydrogen, an electric heater may be attached on a valve shaft of a shut-off valve of the first shut-off valve unit.

In accordance with this configuration, since the electric heater is attached on the valve shaft of the shut-off valve of the first shut-off valve unit, it becomes possible to suppress generation of the liquid air in a connection opening of the first shut-off valve unit.

Advantageous Effects of Invention

The present invention can provide an emergency release system (ERS) for liquefied hydrogen including a reservoir container which is capable of preventing a situation in which liquid air generated in a connection opening of an emergency shut-off valve on a loading arm side (land-based emergency shut-off valve) is dropped to sea surface during activation of the ERS of the loading arm for the liquefied hydrogen.

DESCRIPTION OF EMBODIMENTS

Hereinafter, Embodiment of the present invention will be described by use of Examples.

Example 1

Figure 1:
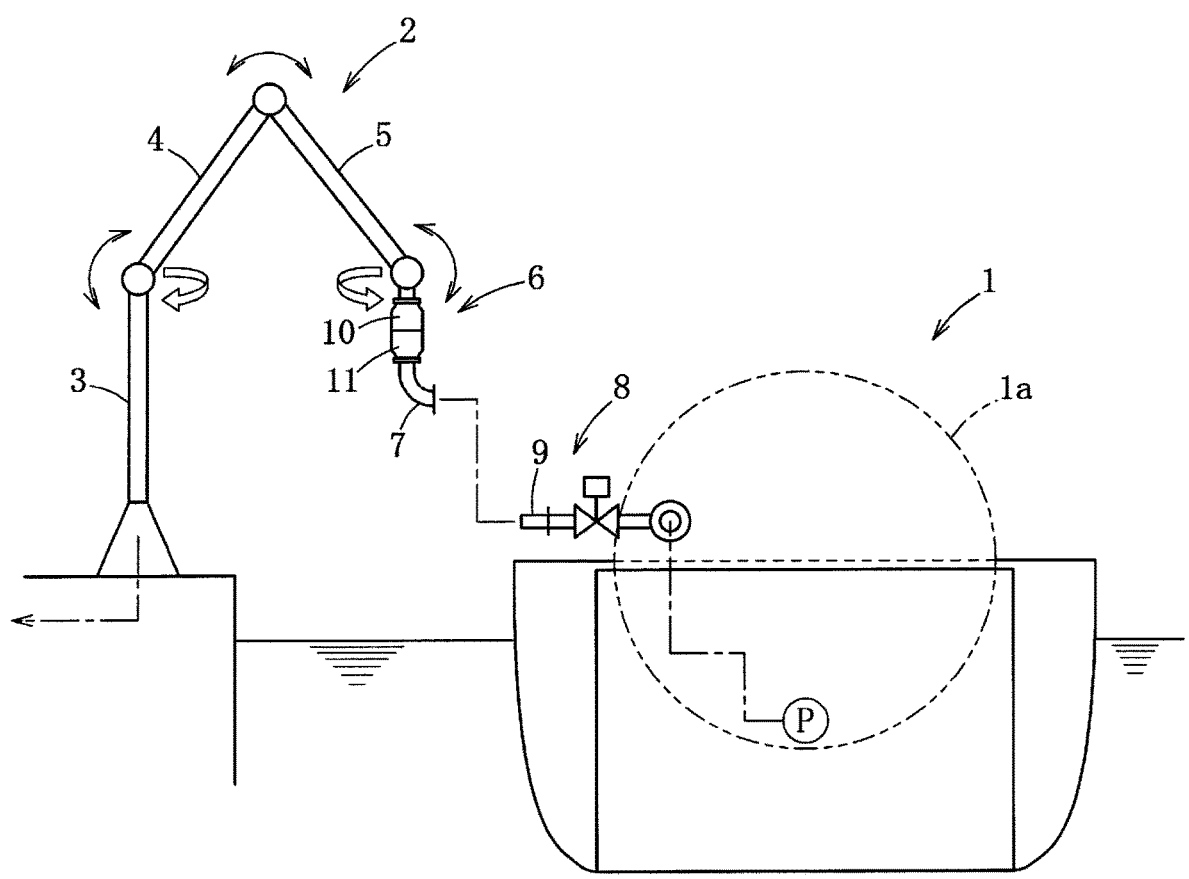
FIG. 1 is a view showing a liquefied hydrogen transport marine vessel and a loading arm according Example 1 of the present invention.

As shown in FIG. 1, a loading arm 2 for liquefied hydrogen including a flexible vacuum heat-insulating double pipe (not shown) in an inside thereof is placed on a land, in order to unload the liquefied hydrogen from a liquefied hydrogen tank 1a of a liquefied hydrogen transport marine vessel 1 to a land-based liquefied hydrogen tank (not shown) or to load the liquefied hydrogen from the land-based liquefied hydrogen tank to the liquefied hydrogen transport marine vessel 1. The vacuum heat-insulating double pipe of the loading arm 2 is connected to the liquefied hydrogen tank (not shown) via a land-based liquefied hydrogen pipe.

This loading arm 2 includes an outer riser 3, an inboard boom 4, and an outboard boom 5, as an outer tube structure which covers and supports the vacuum heat-insulating double pipe which flows the liquefied hydrogen therethrough. The loading arm 2 includes an emergency release system 6 (ERS) connected to the vacuum heat-insulating double pipe, and a vacuum heat-insulating double connection pipe 7 connected to the emergency release system 6.

In a case where the liquefied hydrogen is loaded or unloaded via the loading arm 2, a joint portion at the tip end of the vacuum heat-insulating double connection pipe 7 is connected to a joint portion 9 of a manifold 8 of a liquefied hydrogen pipe provided on the liquefied hydrogen transport marine vessel 1, and in this state, the liquefied hydrogen is transferred.

If weather gets worse and the liquefied hydrogen transport marine vessel 1 significantly shakes, or an earthquake or tsunami occurs in a state in which the loading arm 2 is connected to the joint portion 9 of the manifold 8, the loading arm 2 may be damaged. To avoid this, the loading arm 2 is equipped with the emergency release system 6 (ERS).

Figure 2:
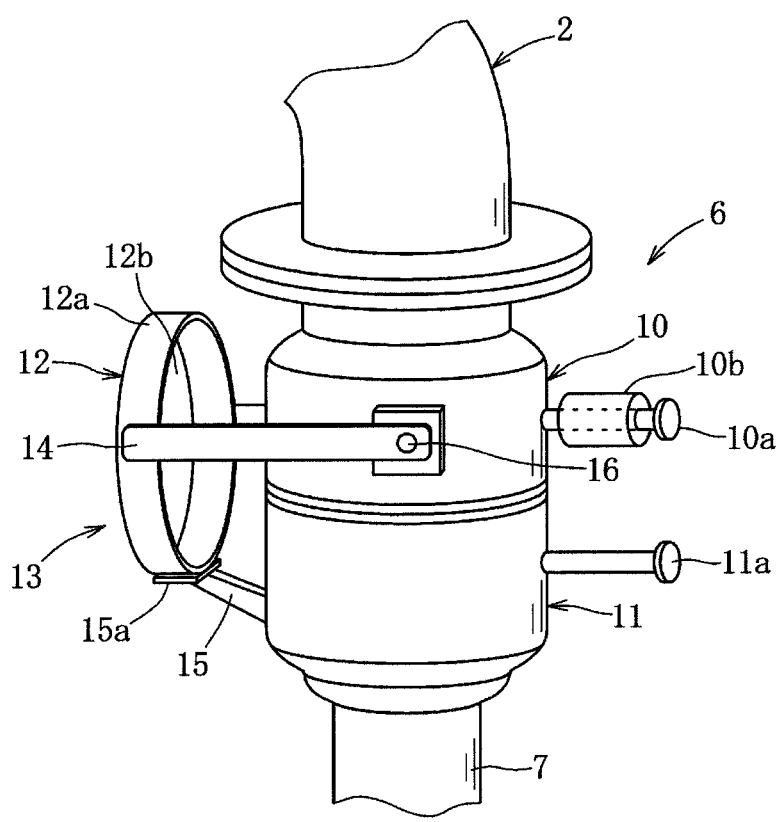
FIG. 2 is a perspective view of an emergency release system (connected state) of the loading arm.

Next, the emergency release system 6 (ERS) will be described with reference to FIGS. 2 and 3.

The emergency release system 6 includes a first shut-off valve unit 10 which is land-based, and a second shut-off valve unit 11 which is provided for the marine vessel and separably connected to the first shut-off valve unit 10. The first shut-off valve unit 10 is provided with a reservoir container 12 which receives liquid air which is generated in a connection opening of the first shut-off valve unit 10 and dropped, in a state in which the second shut-off valve unit 11 is separated from the first shut-off valve unit 10.

The first and second shut-off valve units 10, 11 are provided with valve shafts 10a, 11a, respectively, which are rotated to open and close first and and second emergency shut-off valves provided inside the first and second shut-off valve units 10, 11, respectively. In a case where an unexpected emergency occurs, and the emergency release system 6 is activated, the valve shafts 10a, 11a are rotated to shift the first and second emergency shut-off valves to a closed position. In this state, the first and second shut-off valve units 10, 11 are separated from each other. As a result, a large amount of the liquefied hydrogen does not flow out of the loading arm 2 and the liquefied hydrogen tank 1a.

An electric heater 10b is wound around the valve shaft 10a of the first shut-off valve of the first shut-off valve unit 10. In a case where the emergency release system 6 is activated, an electric current is supplied to the electric heater 10b, to suppress generation of the liquid air in the connection opening of the first shut-off valve unit 10. It should be noted that the electric heater 10b is not essential and may be omitted.

The reservoir container 12 includes a tubular member 12a with a short cylinder shape, and a flat bottom member 12b closing the bottom surface of the tubular member 12a. The reservoir container 12 is automatically shifted from a retracted position to a reserving position by a container support mechanism 13 (described later) in a case where the emergency release system 6 is activated. The reservoir container 12 is formed of a metal material such as SUS for extremely low temperatures or aluminum.

When the reservoir container 12 is at the retracted position, the reservoir container 12 is retained in a vertical posture (the bottom member 12b extends vertically) at a lateral position of the first and second shut-off valve units 10, 11. When the reservoir container 12 is at the reserving position, the reservoir container 12 is retained in a horizontal posture (the bottom member 12b extends horizontally) at a location that is immediately below the first shut-off valve unit 10.

During a normal state, namely, in a case where the emergency release system 6 is not activated, the first and second shut-off valve units 10, 11 are connected to each other, and the reservoir container 12 is retained at the retracted position. On the other hand, in a case where an unexpected emergency occurs, the emergency release system 6 is activated, the first shut-off valve unit 10 is disconnected and separated from the second shut-off valve unit 11, and the reservoir container 12 is automatically moved to the reserving position and retained at the reserving position.

Next, the above-described container support mechanism 13 will be described with reference to FIGS. 2 and 3. The container support mechanism 13 is configured to support the reservoir container 12 and automatically shift the reservoir container 12 from the retracted position to the reserving position. The container support mechanism 13 includes a pair of link members 14 and a stay member 15. The pair of link members 14 and the stay member 15 are formed of a metal material such as SUS or aluminum.

The pair of link members 14 are configured to couple the reservoir container 12 to the first shut-off valve unit 10 in such a manner that the reservoir container 12 and the pair of link members 14 are pivotable. The pair of link members 14 extend from the bottom member 12b to the first shut-off valve unit 10 along a direction perpendicular to the bottom member 12b. The first (one) end portions of the pair of link members 14 are secured to the both side portions, respectively, of the tubular member 12a of the reservoir container 12, by welding. The second (the other) end portions of the pair of link members 14 are hingedly coupled to the both side portions, respectively, of the first shut-off valve unit 10, by use of a pin member 16.

The stay member 15 is configured to receive and hold the lower end of the tubular member 12a from below, and retain the reservoir container 12 at the retracted position, when the reservoir container 12 is at the retracted position. The stay member 15 includes a support base 15a in a first end portion (upper end portion) thereof. The second end portion (lower end portion) of the stay member 15 is secured to one side portion of the second shut-off valve unit 11, by welding.

The operation and advantages of the emergency release system 6 of the loading arm 2 for liquefied hydrogen, configured in the above-described manner, will be described. During the normal state, the emergency release system 6 is not activated, and the first and second shut-off valve units 10, 11 are connected to each other. In this state, as shown in FIG. 2, the lower end portion of the tubular member 12a of the reservoir container 12 is received and held by the support base 15a of the stay member 15 from below. Therefore, the reservoir container 12 is retained at the retracted position that is the lateral position of the first and second shut-off valve units 10, 11.

Figure 3:
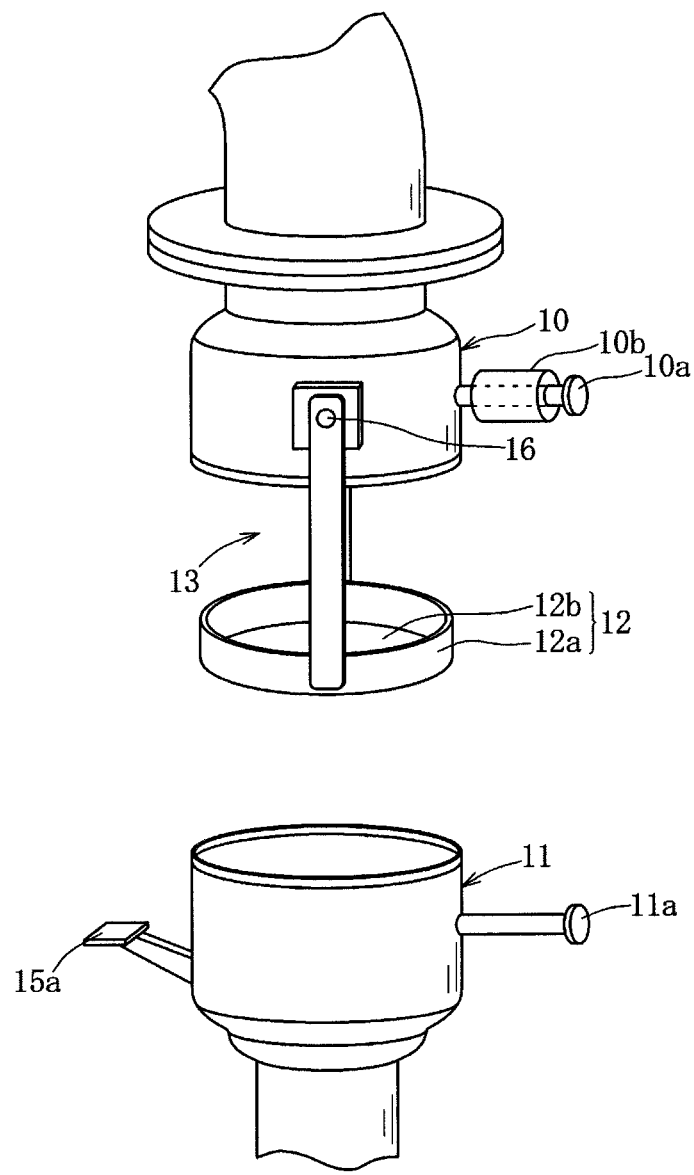
FIG. 3 is a perspective view of the emergency release system (separated state) of the loading arm.

On the other hand, in a case where an unexpected emergency occurs and the emergency release system 6 is activated, the first and second shut-off valve units 10, 11 are immediately disconnected and separated from each other, and the first shut-off valve unit 10 supported by the loading arm 2 is moved upward, as shown in FIG. 3. The stay member 15 ceases to retain the reservoir container 12 at the retracted position. The reservoir container 12 and the container support mechanism 13 are automatically pivoted in a downward direction around the pin member 16, by their own weights. The reservoir container 12 is moved to the reserving position that is immediately below the first shut-off valve unit 10 and stopped in the horizontal posture. Since the reservoir container 12 receives the liquid air generated in the first shut-off valve unit 10 and dropped, it becomes possible to reliably prevent the liquid air from being dropped to sea surface.

Example 2

Figure 4:
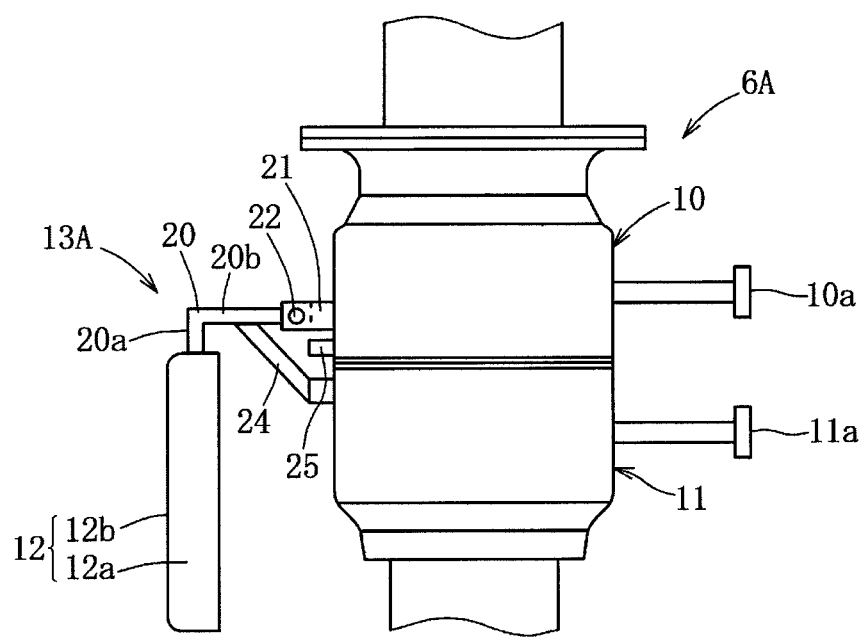
FIG. 4 is a front view of an emergency release system (connected state) of a loading arm according to Example 2.
Figure 5:
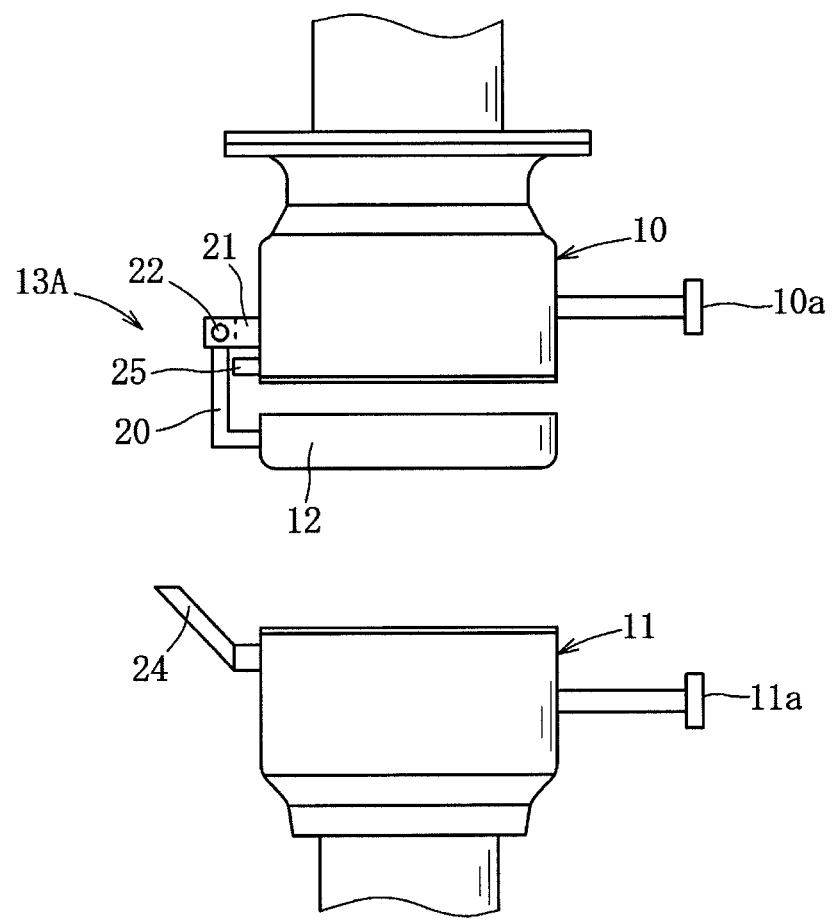
FIG. 5 is a front view of the emergency release system (separated state) of FIG. 4.
Figure 6:
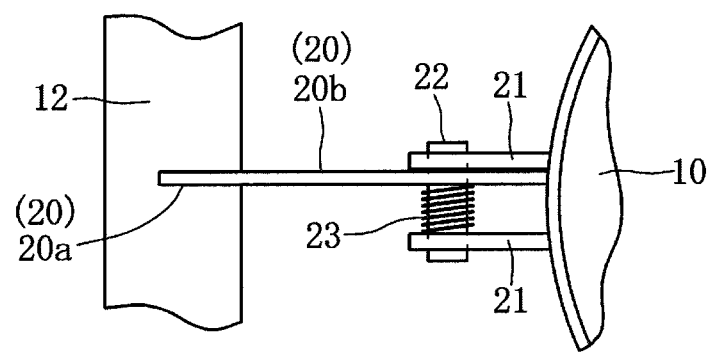
FIG. 6 is an enlarged plan view showing major constituents of a container support mechanism 13A of FIGS. 4 and 5

The present example includes a container support mechanism 13A of FIGS. 4 to 6, instead of the container support mechanism 13 of the above-described Example 1. The constituents other than the container support mechanism 13A are identical to those of Example 1. Therefore, the same constituents are identified by the same reference symbols and will not be described.

The container support mechanism 13A includes a L-shaped member 20, a first end portion of which is secured to the reservoir container 12, a pair of brackets 21 attached on the side portions of the first shut-off valve unit 10, a coupling pin 22 coupling the second end portion of the L-shaped member 20 to the tip end portions of the brackets 21, a spring member 23 which is externally mounted on the coupling pin 22 and configured to bias the reservoir container 12 toward the reserving position, a stay member 24 which is secured to the second shut-off valve unit 11 and configured to receive and hold the reservoir container 12 at the retracted position from below, and a stopper 25 which is secured to the first shut-off valve unit 10 and configured to receive and hold the L-shaped member 20 and retain the reservoir container 12 at the reserving position, in a state in which the first and second shut-off valve units 10, 11 are disconnected and separated from each other.

The L-shaped member 20 includes a first arm portion 20a and a second arm portion 20b. The tip end portion of the first arm portion 20a is secured to the tubular member 12a of the reservoir container 12, by welding. The end portion of the second arm portion 20b is coupled to the pair of brackets 21 via the coupling pin 22 in such a manner that the second arm portion 20b is rotatable. As shown in FIG. 6, the spring member 23 is a distortion spring which is sufficiently tightly wound in a clockwise direction. The tip end portion of the spring member 23 is engaged with the upper surface of the second arm portion 20b. The base end portion of the spring member 23 is engaged with one of the brackets 21. The spring member 23 is configured to bias the L-shaped member 20 and the reservoir container 12 in a counterclockwise direction in FIG. 5.

As shown in FIG. 4, during a normal state, namely, in a case where the emergency release system 6A is not activated, and the first and second shut-off valve units 10, 11 are connected to each other, an intermediate portion of the second arm portion 20b of the L-shaped member 20 is received and held by the tip end of the stay member 24 from below, and the reservoir container 12 is retained at the retracted position that is the lateral position of the first and second shut-off valve units 10,11. At the retracted position, the reservoir container 12 is retained in the vertical posture in which the bottom member 12b extends vertically.

In a case where an unexpected emergency occurs and the emergency release system is activated, the first and second shut-off valve units 10, 11 are immediately disconnected and separated from each other, and the first shut-off valve unit 10 supported by the loading arm 2 is moved upward. Since the stay member 24 ceases to function, the reservoir container 12 is pivoted in the downward direction around the coupling pin 22, by an elastic biasing force applied by the spring member 23.

Then, as shown in FIG. 5, the reservoir container 12 is moved to the reserving position that is immediately below the first shut-off valve unit 10, and the inner surface of the second arm portion 20b of the L-shaped member 20 is engaged with the tip end surface of the stopper 25. Therefore, the reservoir container 12 is retained in the horizontal posture at the reserving position. Since the reservoir container 12 can receive the liquid air generated in the connection opening of the first shut-off valve unit 10 and dropped, it becomes possible to reliably prevent the liquid air from being dropped to sea surface.

Example 3

Figure 7:
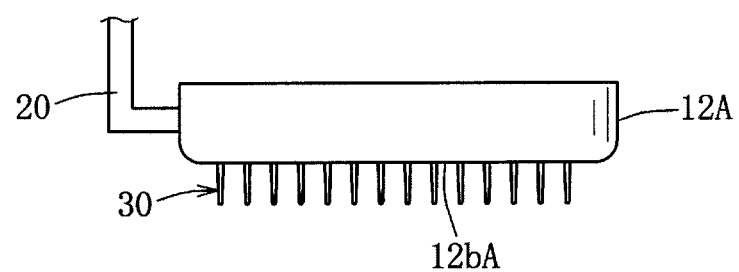
FIG. 7 is an enlarged front view showing major constituents of a reservoir container according to Example 3.

The present example includes a reservoir container 12A of FIG. 7, instead of the reservoir container 12 of the above-described Example 2. The constituents other than the reservoir container 12A are identical to those of Example 2. Therefore, the same constituents are identified by the same reference symbols and will not be described.

The reservoir container 12A is provided with a plurality of fins 30 protruding from the outer surface of a bottom member 12bA of the reservoir container 12A in such a manner that the plurality of fins 30 are integrated with the bottom member 12bA. In a front view, the fins 30 have a tapered shape. In a side view, the fins 30 have a rectangular band shape extending in a forward and rearward direction. The plurality of fins 30 are spaced apart from each other with a specified gap and extend in parallel with each other in a rightward and leftward direction.

With the fins 30, ambient heat can be easily absorbed in the reservoir container 12A, and evaporation of the liquid air generated and received by the reservoir container 12A can be facilitated. The other constituents, operation and advantages are identical to those of Example 2, and therefore will not be described. Alternatively, the fins 30 may be integrated with the bottom member 12b of the reservoir container 12 of Example 1.

Modified examples of the above-described examples will be described.

1) The shape of the reservoir container 12 is not limited to the cylinder, and may be, for example, a rectangular box so long as the reservoir container 12 can reserve the dropped liquid air.

2) The emergency release system of the loading arm for low-temperature fluids of the present invention is applicable in the same manner to a loading arm which unloads the liquefied hydrogen from a tank lorry to a land-based liquefied hydrogen station.

3) Furthermore, those skilled in the art can add a variety of alterations (modifications) to the above-described examples within the scope of the present invention. The present invention encompasses such alterations.

REFERENCE SIGNS LIST 1 liquefied hydrogen transport marine vessel
2 loading arm for low-temperature fluids
6 emergency release system
10 first shut-off valve unit
10b electric heater
11 second shut-off valve unit
12 reservoir container
13, 13A container support mechanism
14 link member
15 stay member
20 L-shaped member
21 a pair of brackets
22 coupling pin
23 spring member
24 stay member
25 stopper
30 fins

The invention claimed is:

1. An emergency release system equipped in a loading arm for liquefied hydrogen, the emergency release system comprising:
   a first shut-off valve unit;
   a second shut-off valve unit which is separably connected to the first shut-off valve unit;
   a reservoir container; and
   a container support arm which is configured to (i) retain the reservoir container at a retracted position at which the reservoir container is not on a flow axis of the first shut-off valve in a state in which the first and second shut-off valve units are connected to each other with a flow axis of the second shut-off valve being aligned with the flow axis of the first shut-off valve in a gravity direction, and (ii) automatically shift the reservoir container to a reserving position that is on the flow axis of the first shut-off valve unit in the gravity direction in a state in which the first and second shut-off valve units are separated from each other, such that the reservoir container receives liquid air dropped from the first shut-off valve unit.

2. The emergency release system for liquefied hydrogen, according to claim 1,
   wherein the reservoir container is retained in a horizontal posture at the reserving position,
   wherein the reservoir container is retained in a vertical posture at the retracted position, and
   wherein the container support arm includes:
      a pair of link members, first end portions of which are secured to both side portions, respectively, of the reservoir container, and second end portions of which are hingedly coupled to both side portions, respectively, of the first shut-off valve unit, the pair of link members extending from the reservoir container to the first shut-off valve unit, and
      a stay member which is secured to the second shut-off valve unit and configured to receive and hold the reservoir container at the retracted position from below.

3. The emergency release system for liquefied hydrogen, according to claim 1,
   wherein the reservoir container is retained in a horizontal posture at the reserving position,
   wherein the reservoir container is retained in a vertical posture at the retracted position, and
   wherein the container support arm includes:
      an L-shaped member, a first end portion of which is secured to a side portion of the reservoir container,
      a pair of brackets attached on side portions of the first shut-off valve unit,
      a coupling pin coupling a second end portion of the L-shaped member to tip end portions of the brackets,
      a spring member which is externally mounted on the coupling pin and configured to bias the reservoir container toward the reserving position,
      a stay member which is secured to the second shut-off valve unit and configured to receive and hold the reservoir container at the retracted position from below, and
      a stopper which is secured to the first shut-off valve unit and configured to receive and hold the L-shaped member and retain the reservoir container at the reserving position, in a state in which the first and second shut-off valve units are separated from each other.

4. The emergency release system for liquefied hydrogen, according to claim 1,
   wherein the reservoir container is provided with a plurality of fins protruding from an outer surface of the reservoir container in such a manner that the plurality of fins are integrated with the reservoir container.

5. The emergency release system for liquefied hydrogen, according to claim 1,
   wherein an electric heater is attached on a valve shaft of a shut-off valve of the first shut-off valve unit.

6. The emergency release system for liquefied hydrogen, according to claim 2,
   wherein the reservoir container is provided with a plurality of fins protruding from an outer surface of the reservoir container in such a manner that the plurality of fins are integrated with the reservoir container.

7. The emergency release system for liquefied hydrogen, according to claim 3,
   wherein the reservoir container is provided with a plurality of fins protruding from an outer surface of the reservoir container in such a manner that the plurality of fins are integrated with the reservoir container.

8. The emergency release system for liquefied hydrogen, according to claim 2,
   wherein an electric heater is attached on a valve shaft of a shut-off valve of the first shut-off valve unit.

9. The emergency release system for liquefied hydrogen, according to claim 3,
   wherein an electric heater is attached on a valve shaft of a shut-off valve of the first shut-off valve unit.

* * * * *